(12) United States Patent
Scott, IV

(10) Patent No.: US 8,136,303 B2
(45) Date of Patent: Mar. 20, 2012

(54) RE-DEPLOYABLE ABOVE GROUND SHELTER

(75) Inventor: Oscar T. Scott, IV, Amarillo, TX (US)

(73) Assignee: Oscar T. Scott, IV, Amarillo, TX (US)

( * ) Notice: Subject to any disclaimer, the term of this patent is extended or adjusted under 35 U.S.C. 154(b) by 49 days.

(21) Appl. No.: 12/579,004

(22) Filed: Oct. 14, 2009

(65) Prior Publication Data

US 2010/0088974 A1   Apr. 15, 2010

Related U.S. Application Data

(60) Provisional application No. 61/105,245, filed on Oct. 14, 2008, provisional application No. 61/106,416, filed on Oct. 17, 2008.

(51) Int. Cl.
*E04H 9/14* (2006.01)
(52) U.S. Cl. ....... 52/2.25; 52/2.11; 52/79.5; 52/DIG. 11
(58) Field of Classification Search .......... 454/243, 454/250, 359, 363; 52/2.13, 2.14, 2.16, 2.25, 52/79.5, 84, 146, 149, 169.12, 198, DIG. 3, 52/DIG. 11
See application file for complete search history.

(56) References Cited

U.S. PATENT DOCUMENTS

| | | | |
|---|---|---|---|
| 1,122,375 A | 12/1914 | Engle | |
| 1,122,431 A | 12/1914 | Sexton | |
| RE24,895 E * | 11/1960 | Clements | ...... 280/639 |
| 2,976,875 A * | 3/1961 | Hoffman | ...... 52/2.16 |
| 3,170,472 A * | 2/1965 | Cushman | ...... 52/2.16 |
| 3,302,552 A | 2/1967 | Walsh | |
| 3,335,529 A * | 8/1967 | Gedney | ...... 52/2.14 |
| 3,342,444 A * | 9/1967 | Nelson | ...... 52/165 |
| 3,509,811 A | 5/1970 | Topp | |
| 3,685,426 A | 8/1972 | Rosa | |
| 3,788,207 A | 1/1974 | Doherty, II | |
| 3,817,009 A | 6/1974 | Elder | |
| 3,893,383 A | 7/1975 | Jones | |
| 3,984,947 A | 10/1976 | Patry | |
| 4,016,730 A | 4/1977 | DeVilliers | |
| 4,162,597 A | 7/1979 | Kelly | |
| 4,223,486 A | 9/1980 | Kelly | |
| 4,268,066 A * | 5/1981 | Davis | ...... 280/763.1 |
| 4,512,243 A | 4/1985 | Ballard et al. | |
| 4,538,508 A | 9/1985 | Ballard | |
| 4,557,081 A | 12/1985 | Kelly | |
| 4,593,504 A | 6/1986 | Bonnici et al. | |
| 4,608,792 A | 9/1986 | Gerber | |
| 4,635,412 A * | 1/1987 | Le Poittevin | ...... 52/79.5 |
| 4,641,571 A | 2/1987 | Anderson et al. | |

(Continued)

FOREIGN PATENT DOCUMENTS

WO   WO 9317208 A1 *  9/1993

*Primary Examiner* — Brian Glessner
*Assistant Examiner* — Christine T Cajilig
(74) *Attorney, Agent, or Firm* — Yudell Isidore Ng Russell PLLC

(57) ABSTRACT

Work crews temporarily operating in remote areas can be subject to dangers such as tornadoes, hurricanes and explosive blast waves. A re-deployable aboveground protective shelter suitable for use in such environments utilizes retractable stabilizing arms and/or passive valved ductwork to resist uplift, overturning and sliding. Because the protective shelter does not rely upon excessive weight to counter wind forces, the protective shelter can be quickly, easily and inexpensively redeployed to new sites.

30 Claims, 15 Drawing Sheets

U.S. PATENT DOCUMENTS

| | | | |
|---|---|---|---|
| 4,652,321 A | 3/1987 | Greko | |
| 4,759,272 A | 7/1988 | Zaniewski | |
| 4,803,111 A | 2/1989 | Mansell | |
| 4,843,794 A | 7/1989 | Holtgreve | |
| 4,848,653 A | 7/1989 | Van Becelaere | |
| 4,850,166 A | 7/1989 | Taylor | |
| 4,876,950 A | 10/1989 | Rudeen | |
| 4,888,930 A | 12/1989 | Kelly | |
| 4,909,135 A | 3/1990 | Greko | |
| 4,963,761 A | 10/1990 | Wight | |
| 4,965,971 A | 10/1990 | Jean-Jacques et al. | |
| 5,009,149 A | 4/1991 | MacLeod et al. | |
| 5,431,240 A * | 7/1995 | Merritt | 180/9.42 |
| 5,734,215 A | 3/1998 | Taghezout et al. | |
| 5,749,780 A | 5/1998 | Harder et al. | |
| 5,766,071 A | 6/1998 | Kirkwood | |
| 5,966,956 A * | 10/1999 | Morris et al. | 62/259.1 |
| 6,006,482 A | 12/1999 | Kelly | |
| 6,325,712 B1 | 12/2001 | Lawless, III et al. | |
| 6,484,459 B1 * | 11/2002 | Platts | 52/219 |
| 6,591,564 B2 * | 7/2003 | Cusimano | 52/274 |
| 7,001,266 B2 | 2/2006 | Jones et al. | |
| 7,036,786 B1 * | 5/2006 | Schura | 248/346.03 |
| 7,543,594 B2 * | 6/2009 | Novak | 135/116 |
| 2005/0235819 A1 * | 10/2005 | Long | 89/36.07 |
| 2006/0048458 A1 | 3/2006 | Donald et al. | |

\* cited by examiner

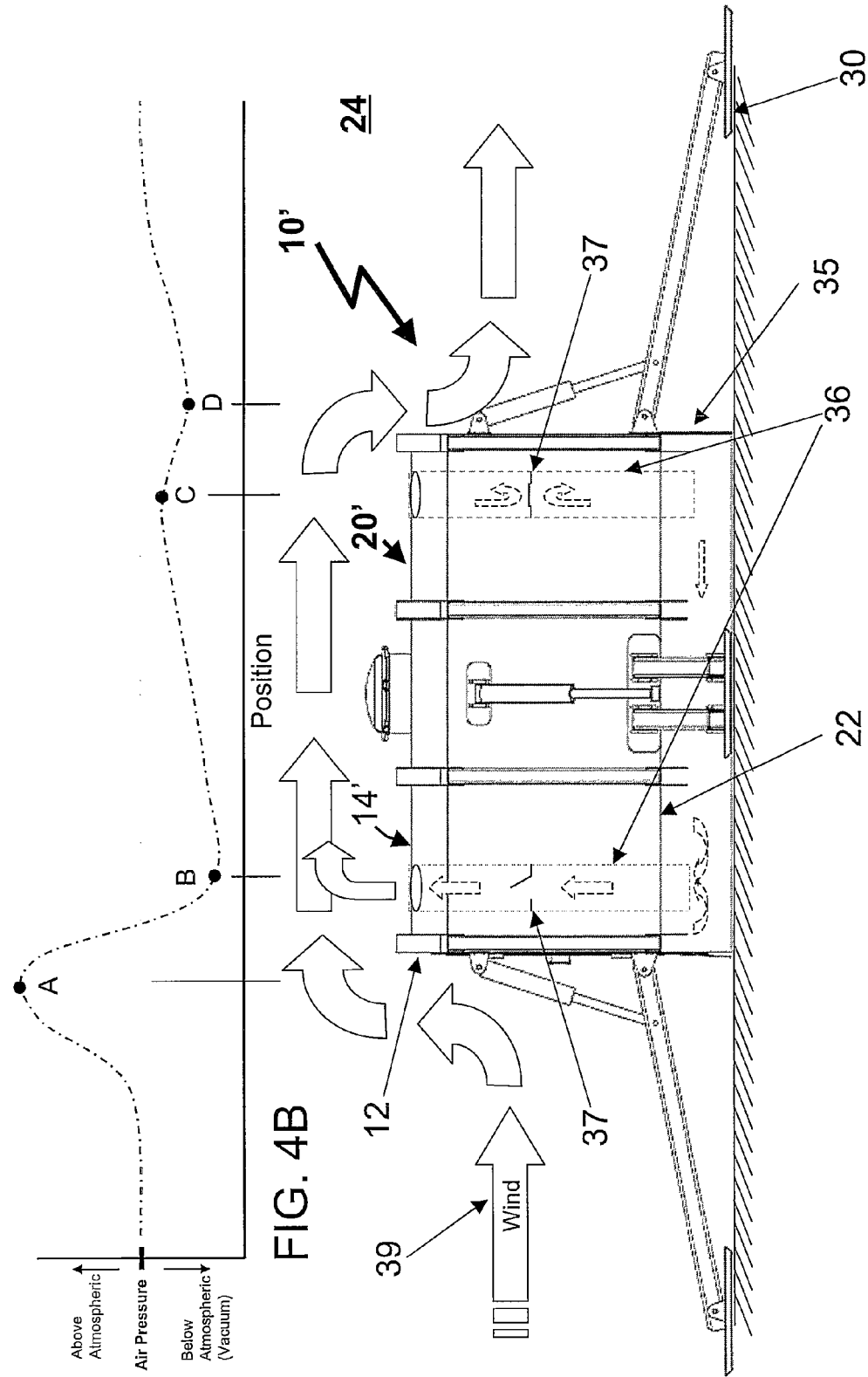

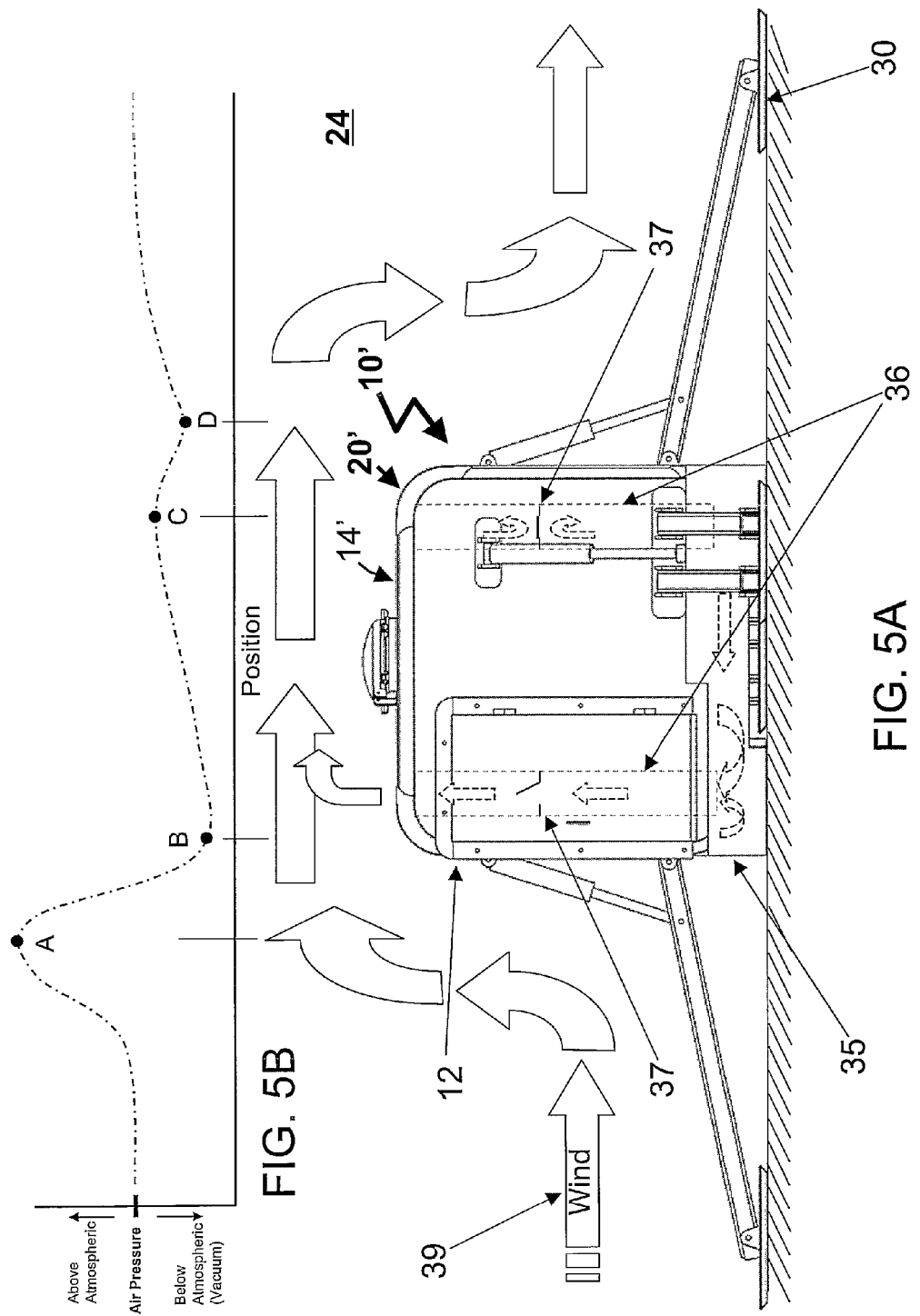

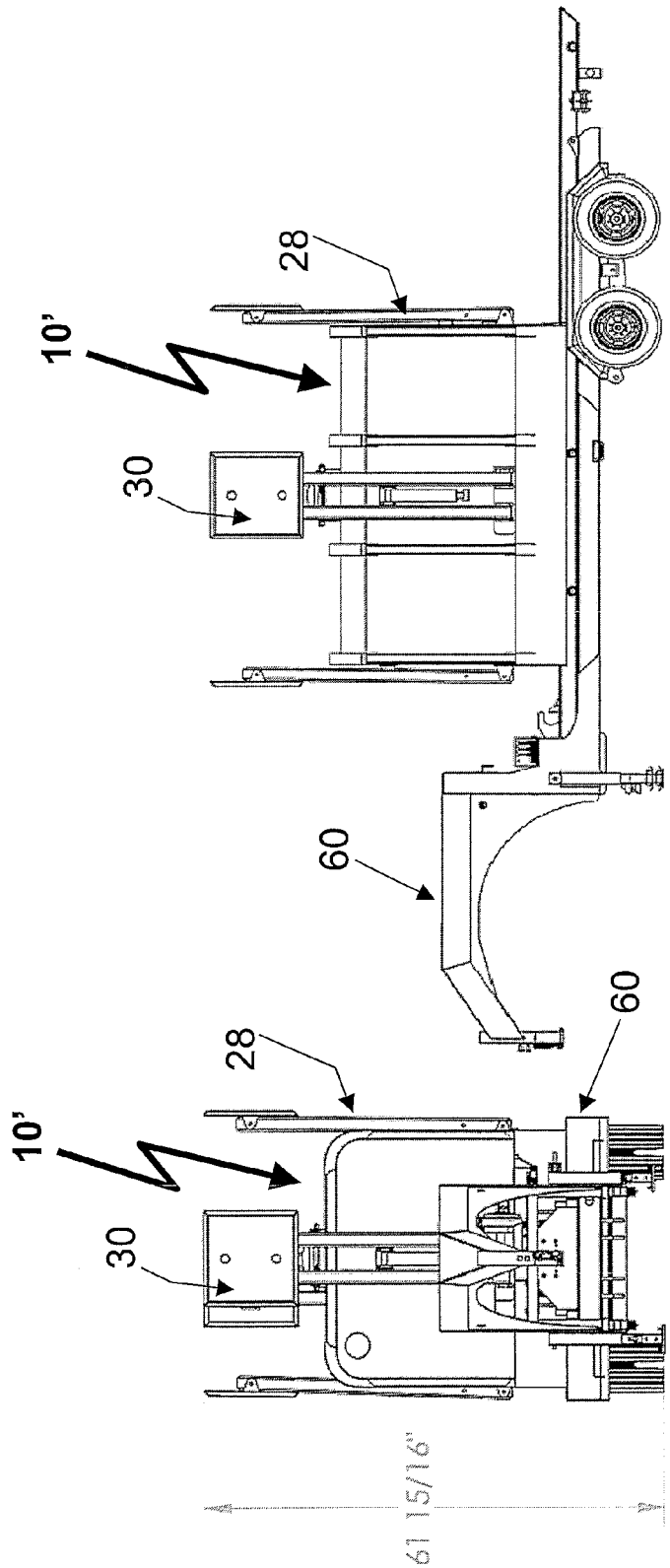

RE-DEPLOYABLE ABOVE GROUND SHELTER

PRIORITY CLAIM AND CROSS-REFERENCE

The present application claims priority to U.S. Provisional Patent Applications 61/105,245 and 61/106,416, which are incorporated herein by reference in their entireties.

BACKGROUND OF THE INVENTION

1. Technical Field

The present invention relates generally to protective shelters, and more particularly to redeployable aboveground shelters using valved ducting and/or retractable stabilizers to resist movement during high velocity wind events.

2. Description of the Related Art

The construction of storm shelters, safe rooms and blast resistant modules is well known and thoroughly documented, for example, in FEMA 320, Third Edition and FEMA 361, Second Edition, both available from the Federal Emergency Management Agency (FEMA), as well as in ICC/NSSA 500: 2008 Standard for the Design and Construction of Storm Shelters, published jointly by the International Code Council (ICC) and the National Storm Shelter Association (NSSA) and in Section 6, Wind Loads, of Minimum Design Loads for Buildings and Other Structures, SEI/ASCE 7-05, 2005, ISBN: 0-7844-0809-2, published by the American Society of Civil Engineers. To meet safety standards, conventional shelters require either burial below ground or, for aboveground shelters, secure fastening of the shelter by numerous metal bolts or adhesives to heavy foundations or concrete "pads". For aboveground shelters, the combined weight of the shelter plus its foundation or "pad" is the primary factor relied upon to resist movement of the shelter (and thus provide protection of its occupants) during high velocity wind events. In virtually all instances non-residential aboveground shelters are designed to be permanently installed at one location.

The unavailability of redeployable protective shelters leaves at risk personnel that are temporarily located where severe wind events may occur. Those working on oil well drilling rigs, pipeline construction, wind turbine erection, petroleum refineries, compressor station repair, and road construction and repair are examples of personnel at risk. One of the challenges of providing severe wind event protection for such personnel is the need for the shelter to be able to be easily, quickly and inexpensively relocated to different work sites as the crews frequently relocate.

Conventional above ground protective shelters depend almost completely upon the total weight of the shelter and its attached concrete foundation to resist movement. To a lesser degree, the large width of the required concrete foundation also helps the assembly resist overturning. To resist wind induced overturning, uplift and sliding, some shelters require the use of expensive subterranean concrete footings in addition to the wide width and massive weight of the foundational pads. Although pre-cast concrete industrial shelters are available, their immense weight (approximately 75,000 lbs.) requires the use of specially permitted and oversized trucks to haul them and heavy cranes to lift them into place, which renders their temporary redeployment impractical. Some conventional metal shelters can be unbolted from their heavy concrete bases and moved more easily. However, each new location requires the preparation of another heavy concrete pad to which the shelter can be bolted. In most instances the cost and inconvenience of pouring of a new pad (and the attendant environmental impact of their subsequent demolition and removal) renders impracticable the redeployment of a metal protective shelter for temporary use.

SUMMARY OF THE INVENTION

Work crews temporarily operating in remote areas can be subject to dangers such as tornadoes, hurricanes and explosive blast waves. A re-deployable aboveground protective shelter suitable for use in such environments utilizes retractable stabilizing arms and/or passive valved ductwork to resist uplift, overturning and sliding. Because the protective shelter does not rely upon excessive weight to counter wind forces, the protective shelter can be quickly, easily and inexpensively redeployed to new sites.

BRIEF DESCRIPTION OF THE DRAWINGS

FIG. 4A is a side elevation view of the long sidewall of the protective shelter of FIG. 2 illustrating the operation of the air ducts and valves during a high velocity wind event;

FIG. 4B is a Cartesian graph of static air pressures versus position along the long sidewall of the protective shelter of FIG. 4A during a high velocity wind event;

FIG. 5A is a side elevation view of the short sidewall of the protective shelter of FIG. 2 illustrating the operation of the air ducts and valves during a high velocity wind event;

FIG. 5B is a Cartesian graph of static air pressures versus position along the short sidewall of the protective shelter of FIG. 5A during a high velocity wind event;

FIGS. 6A-6B respectively depict end and side elevation views of an assembly comprising the protective shelter of FIG. 2 loaded on a roll-off transport;

DETAILED DESCRIPTION OF ILLUSTRATIVE EMBODIMENT

In various embodiments, an aboveground protective shelter can utilize an air ducting system and/or retractable stabilizers to resist movement of the shelter during a high wind event, such as a tornado, hurricane or explosion blast. If present, the air ducting system utilizes the reduced air pressure that forms above the shelter roof and/or on the downwind sidewall(s) during a high wind event (as described by Bernoulli's principle) to evacuate a substantially enclosed space beneath the shelter floor, reducing the air pressure in the enclosed space to below that of the surrounding atmospheric pressure and offsetting the aerodynamic lift produced by the wind accelerating over the shelter roof. The greater the wind velocity over the shelter, the greater the holding force created in the enclosed space beneath the shelter, with the holding force in some embodiments always exceeding the lift. The retractable stabilizers, if present and deployed, increase the effective length and/or width of the protective shelter, increasing the moment arms acting to resist overturning forces. Although the vacuum alone is in many embodiments sufficient to hold the shelter against wind forces, the stabilizers can be utilized to provide redundancy and added safety margin.

Figure 1A:
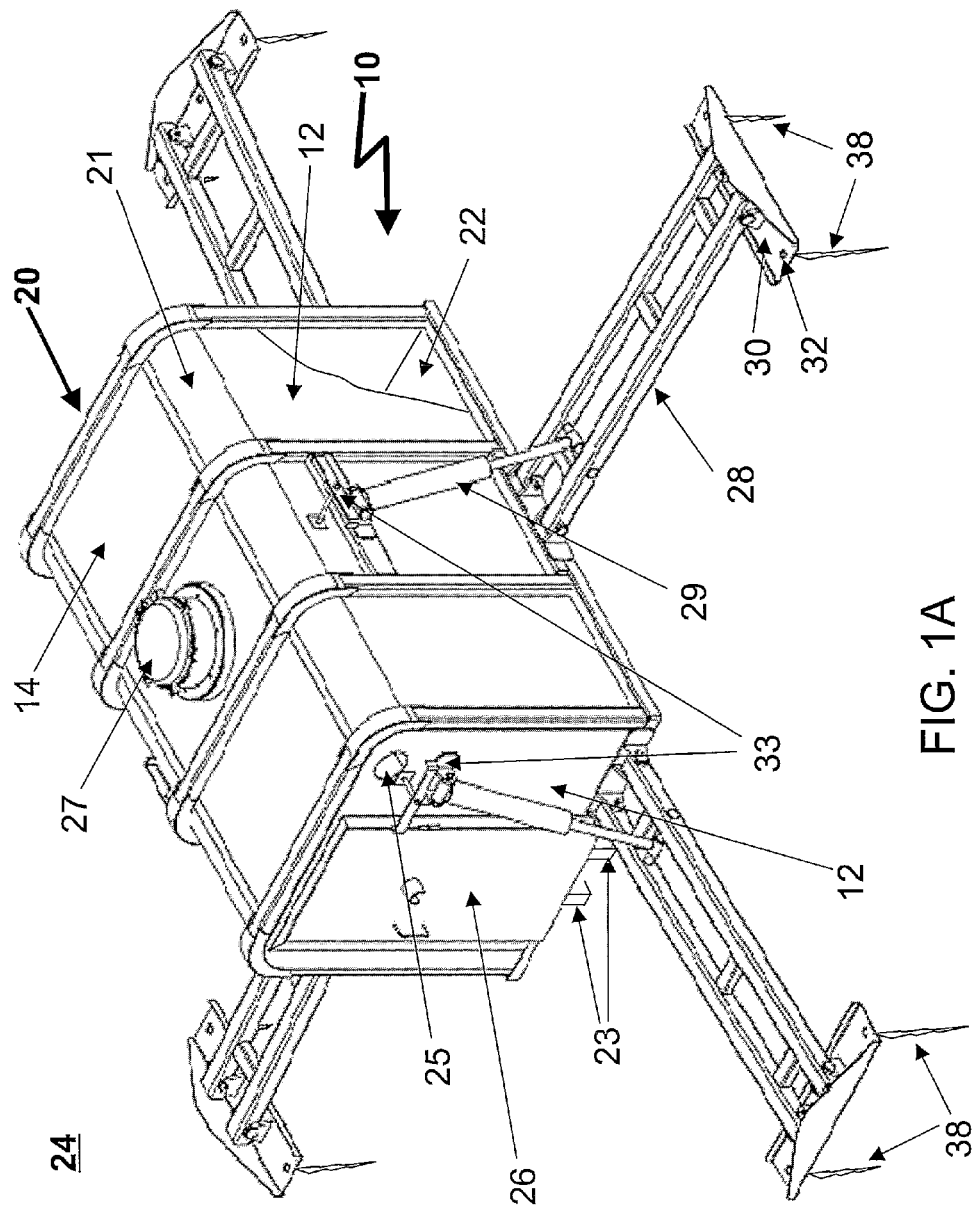
FIG. 1A is a perspective view of an entry end of a first embodiment of a protective shelter as seen from above.

With reference now to FIG. 1A, there is illustrated a perspective view of the entry end of a first embodiment of a protective shelter 10 as seen from above. In an exemplary implementation, protective shelter 10 includes an enclosure 20 constructed of formed and/or welded, reinforced steel (or steel alloy) plate of sufficient strength to protect occupants and contents of protective shelter 10 from high velocity wind events, impact and penetration by wind borne debris. In the depicted embodiment, enclosure 20 has a generally rectangular prismatic shape having a floor 22, four sidewalls 12, and a roof 14 all formed of reinforced steel plate.

For example, enclosure 20 can be made of welded A36, ¼" steel plate with reinforcing ribs of sufficient size, placement and design to meet or exceed deflection and penetration limits established by the National Storm Shelter Association (NSSA) standard, the Federal Emergency Management Agency (FEMA) standards, the American Society of Civil Engineers (ASCE) standards and/or the ICC/NSSA 500 standard. Lesser or greater material thicknesses, types, and strengths can alternatively be used.

Figure 1B:
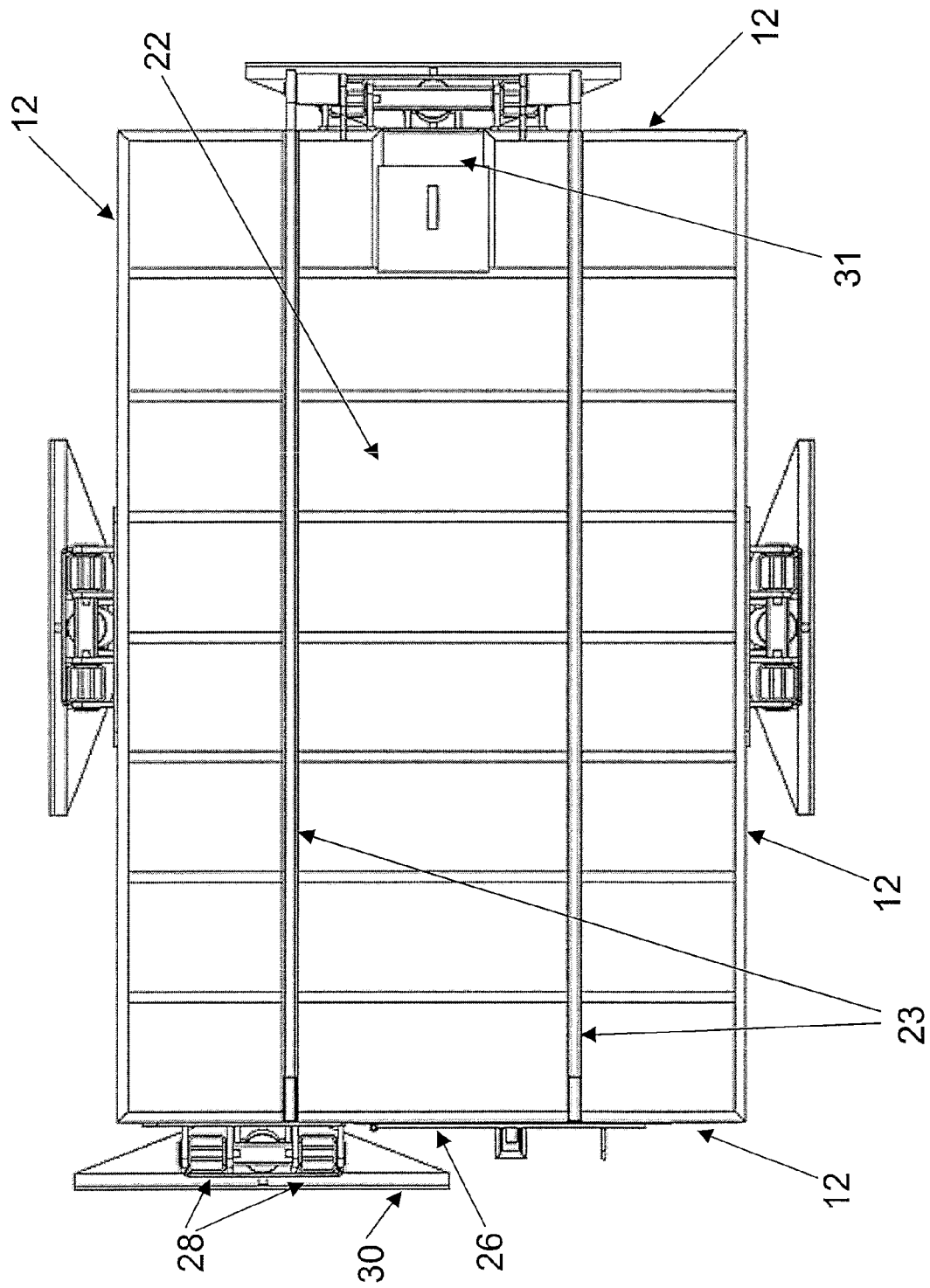
FIG. 1B is a bottom plan view of the protective shelter of FIG. 1A.
Figure 1C:
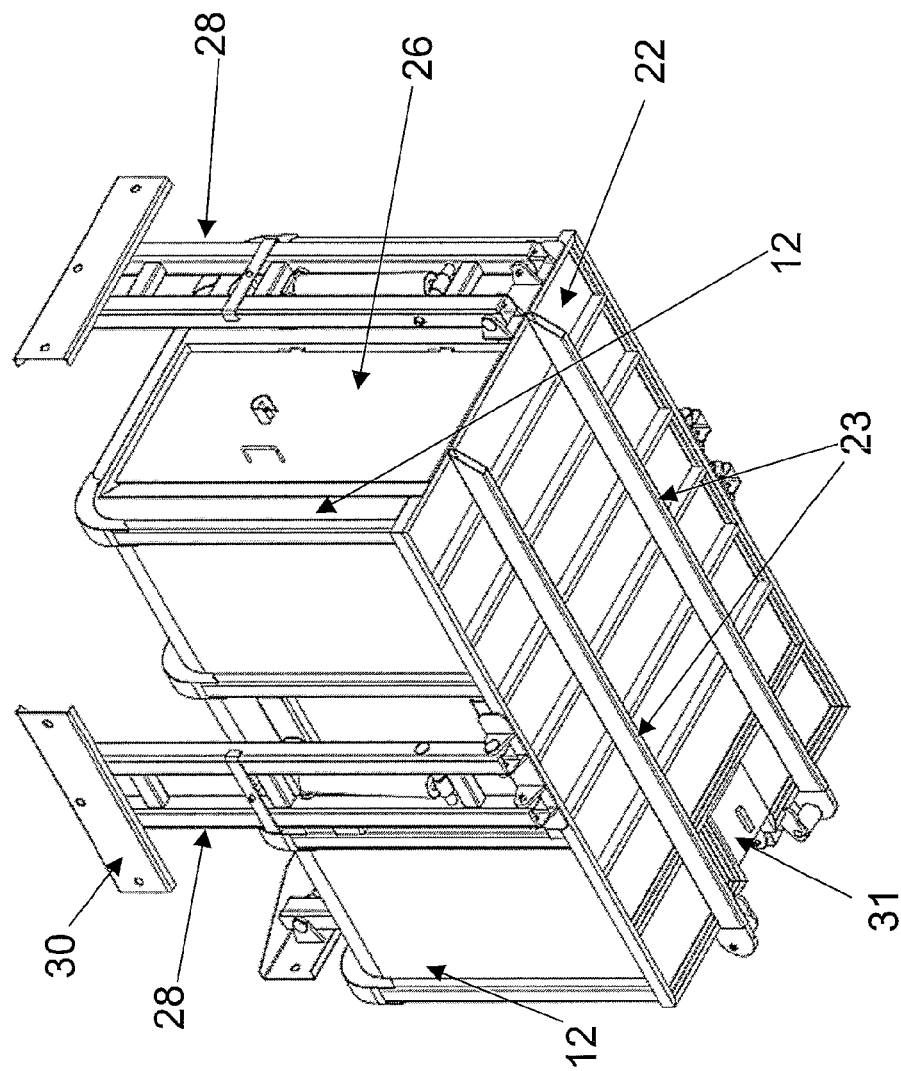
FIG. 1C is a perspective view of an entry end of the protective shelter of FIG. 1A with its stabilizers retracted, as seen from below.
Figure 1D:
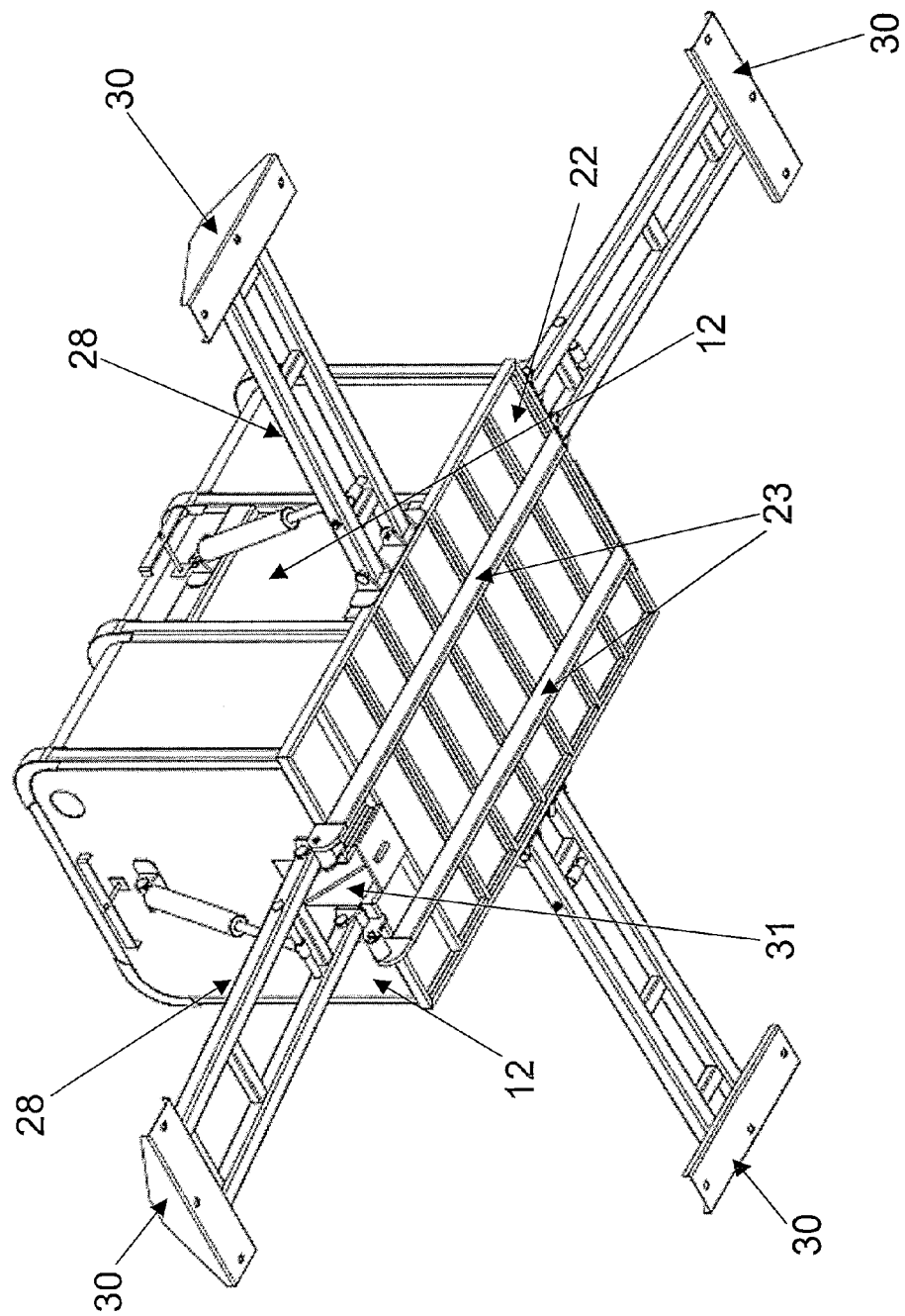
FIG. 1D is a perspective view of a back end of the protective shelter of FIG. 1A with its stabilizers extended, as seen from below.

In a preferred embodiment, floor 22 of enclosure 20 is welded to and rests upon one or more (e.g., two) undercarriage rails 23 (as illustrated in FIGS. 1B-1D) that elevate floor 22 above the underlying substrate (e.g., ground, pavement, rig platform, etc.) when protective shelter 10 is deployed in environment 24. In at least some embodiments, undercarriage rails 23 conform to the standard design for roll-off containers, thus allowing the shelter to be loaded and unloaded from a conventional roll-off transport truck or trailer. For example, according to one conventional standard, protective shelter 10 has two parallel undercarriage rails 23 formed of 2"×6"×¼" (or ⅜") steel plate that are symmetrically disposed about a central axis of floor 22 and that are spaced by 36½". The undercarriage rails are preferably configured (e.g., with openings or spacers place between the rails 23 and the shelter floor 20) so as to not inhibit but to allow the free passage of air from any locale beneath the shelter to any other locale.

Sidewalls 12 are preferably welded to floor 22 to form a substantially air-tight connection. One or more security doors 26 (see, e.g., FIGS. 1A and 1C) are provided in one or more of sidewalls 12 to permit ingress and egress into and out of the interior volume of enclosure 20 and, upon being securely closed, to isolate personnel and articles within enclosure 20 from external threats. Sidewalls 12 may be further provided with shielded ventilation and pressure relief openings 25 (e.g., in each of a pair of opposing sidewalls 12) of sufficient size to provide sufficient breathing air for the rated number of shelter occupants in accordance with the ICC/NSSA 500 standard. It is preferable if at least one sidewall 12 has formed therein a cavity 31 housing a standardized cable connection for attaching the loading winch of a roll-off transport truck or trailer.

In the depicted embodiment, roof 14, which is welded to each of sidewalls 12, has a curved roof portion 21 along the upper edges of one or more walls 12 (e.g., the two walls 12 having the greater length). Roof 14 may also have at least one escape hatch 27 to permit egress from enclosure 20 in the event security door 26 becomes inoperable or otherwise blocked.

Still referring to FIG. 1A and additionally to FIGS. 1B, 1C and 1D, protective shelter 10 may optionally further be equipped with one or more extendable and retractable stabilizers (outriggers) 28, that when extended from enclosure 20 (as shown in FIGS. 1A and 1D) increase the effective width and/or length (and hence moment of inertia) of protective shelter 10. In the depicted embodiment, stabilizers 28 are lowered from the retracted position shown in FIGS. 1B-1C to the extended position shown in FIGS. 1A and 1D and raised from the extended position to the retracted position by internally self locking or the more simple standard hydraulic actuators 29. In alternative embodiment, stabilizers 28 can be operated by pneumatic, electrical, mechanical or manual actuators used individually or in combination to raise, lower, test and lock into place all stabilizers during initial deployment of the unit and its subsequent loading for transport and/or redeployment. When stabilizers 28 are in the retracted position, as shown in FIGS. 6A-6B, retaining pins 33 may be utilized to secure stabilizers 28, for example, to facilitate transport of protective shelter 10. Exemplary dimensions for stabilizers 28 are given in FIG. 3.

Stabilizers 28 may be tipped with force-spreading feet 30 optionally having openings 32 therein to permit installation of optional anchors 38. In some embodiments, anchors 38 need only be of such size and material as to withstand the shear forces of the wind against the windward and leeward sidewalls 12. Anchors 38 can include and be implemented, for example, with commercially available earth anchors or earth screws or even simple metal rods with caps or heads sized to prevent being pulled through openings 32. As will be appreciated, the use and holding strength required of anchors 38 to resist sliding and overturning of protective shelter 10 will vary between embodiments and between installation conditions. Thus, for heavier embodiments (e.g., 20,000 lbs.) or for heavy clay soils, anchors 38 exhibiting less holding strength can be employed. For lighter embodiments (e.g., 12,000 lbs.) or for sandy or loamy soils, anchors 38 exhibiting greater holding strength are preferably employed.

Stabilizers 28 can be used to field prove the holding strength of the protective shelter 10 and therefore verify that a particular installation of protective shelter 10 can withstand the design wind speed. As an initial step, accurate calculations of the overturning and uplift forces produced on protective shelter 10 by a wind of the rated speed (e.g., 250 mph) are made, for example, utilizing the Wind Loads on Structures software commercially available from Standards Design Group, Inc. (SDG) of Lubbock, Tex. Hydraulic actuators 29 can then be used to attempt to pull out the anchors 38. If, during this process, the hydraulic pressure reaches a predetermined level (determined, for example, by the hydraulic cylinder diameter, length of stabilizer 28, and the weight of protective shelter 10) corresponding to the force exerted on protective shelter 10 by a wind of rated speed (or exceeds that force by some desirable safety factor) without withdrawing anchor(s) 38, then the installation of protective shelter 10 is guaranteed to withstand a wind of rated speed.

Figure 9:
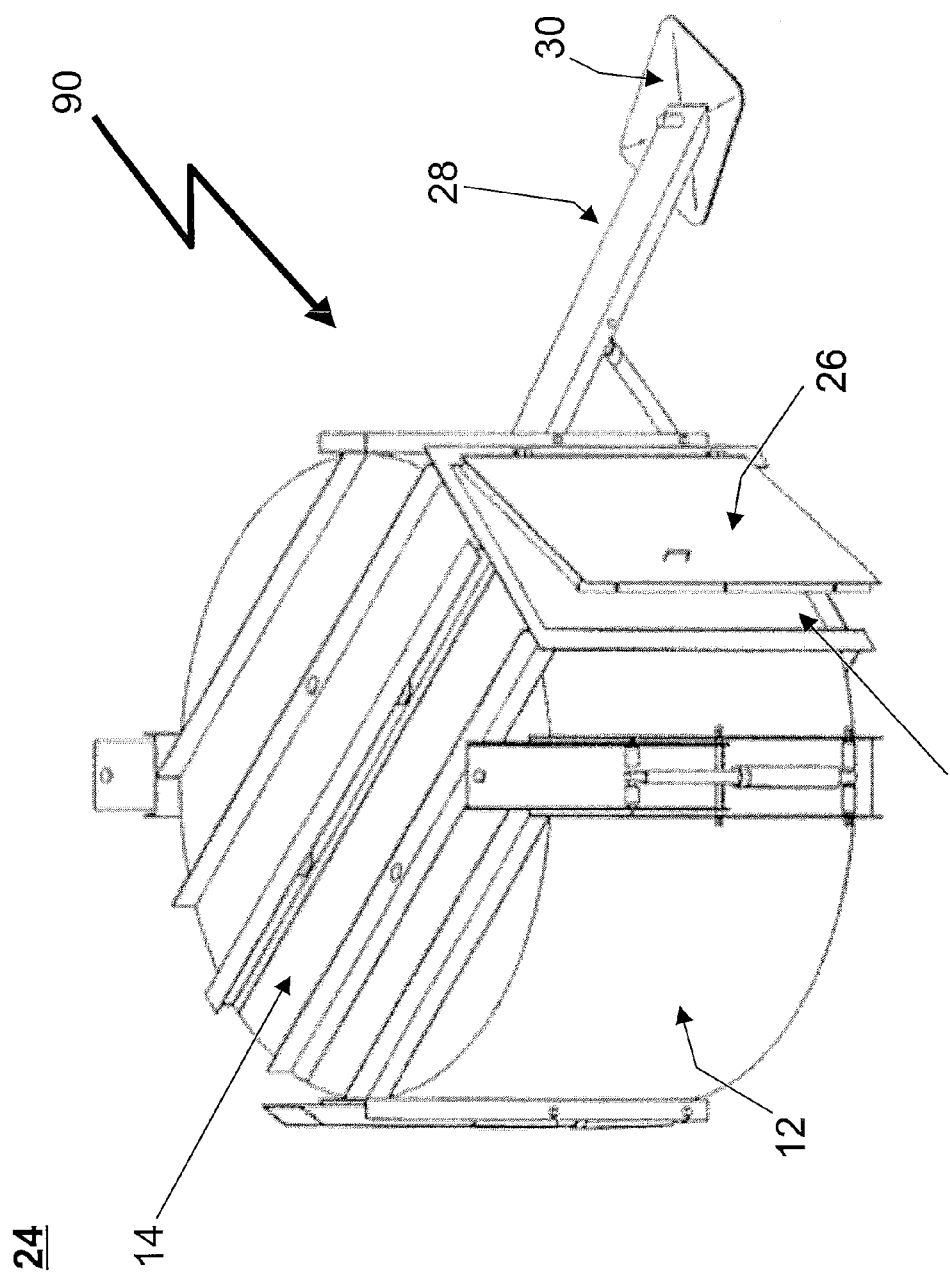
FIG. 9 is a perspective view of a fourth embodiment of a protective shelter.

Although virtually any shape of enclosure 20 can be employed, the presently preferred shapes and sizes fall within state and federal Department of Transportation (DOT) height, width, length and weight limits for non-permitted loads on public roadways. For example, one preferred shape is a rectangular prism that, due to its geometry, affords maximum refuge space for occupants, and that, when loaded on its transport device, has a height, width, length and weight that do not exceed DOT limits. Alternatively, a vertical cylindrical shape (with any shape or style of roof) can be employed; however, the floor area (and hence occupancy rating) for a cylindrical design is less than that of a rectangular prism having a minimum sidewall length at least equal to the diameter of the cylinder. An exemplary protective shelter 90 including a cylindrical enclosure with a substantially flat roof 14 is depicted in FIG. 9.

The height of enclosure 20 can also vary between embodiments, with shorter heights generally being preferred because the overturning force on the windward wall varies with the square of the height if all other factors remaining constant. A typical height of enclosure 20 is between 72 and 96 inches.

It should be understood that virtually any shape and style of roof (e.g., flat, round, parapet, hip, gable, mansard, etc.) can be utilized in the various embodiments of the disclosed protective shelter. However, a roof having inwardly sloping or convexly curved outer edges on at least two sides and a flat central portion is presently preferred. Such a design is preferable because the net uplift created by wind passing over enclosure 20 having such a roof design is generally less than those having alternative roof designs. Furthermore, such a roof design creates a region of low pressure concentrated along the beginning of flat portion of the windward roof edge. As discussed further below, the low pressure can be beneficially redirected by a ducting system beneath the shelter floor to assist in resisting movement of protective shelter 10 by high velocity winds.

Figure 2:
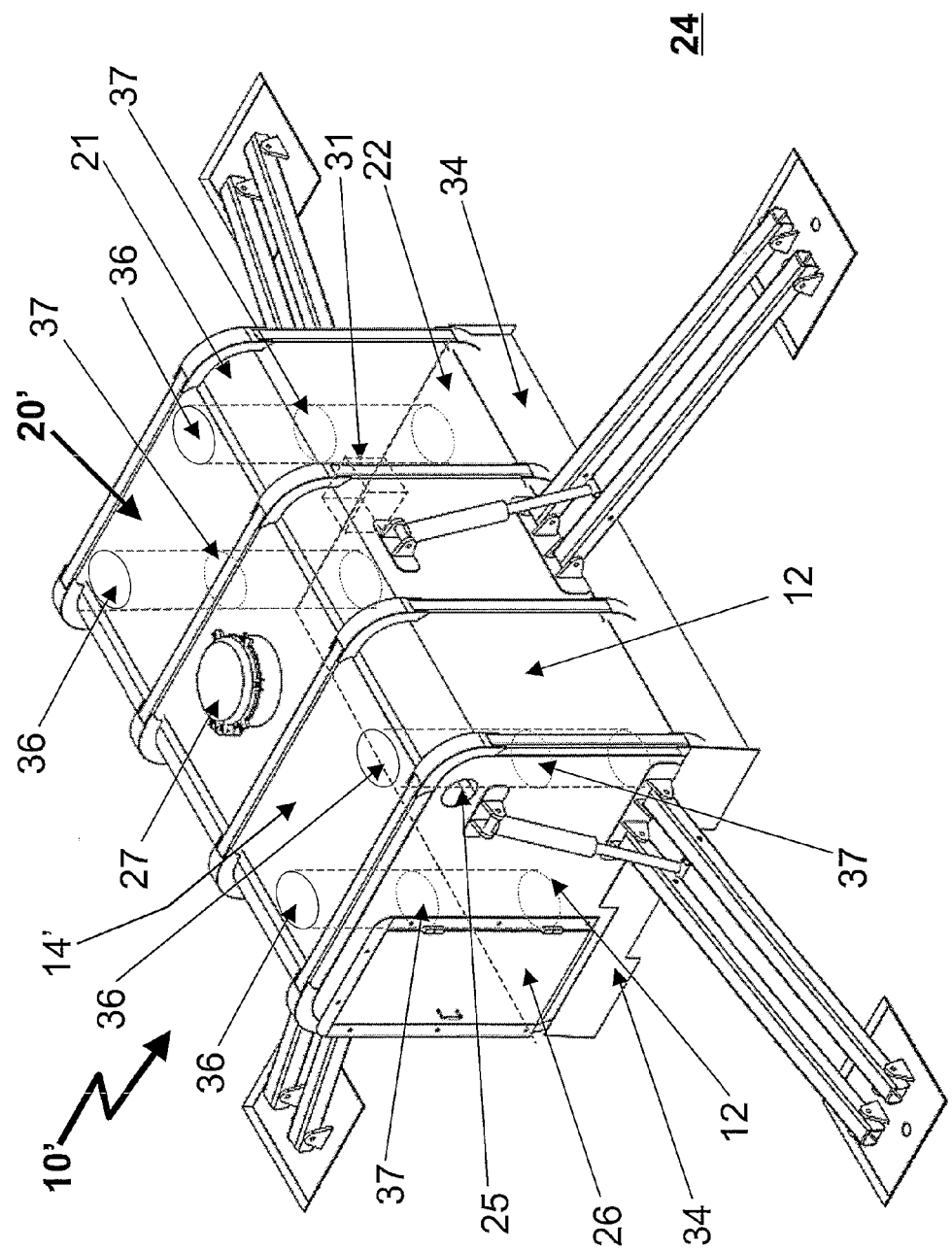
FIG. 2 is an entry end perspective view of a second embodiment of a protective shelter.
Figure 3:
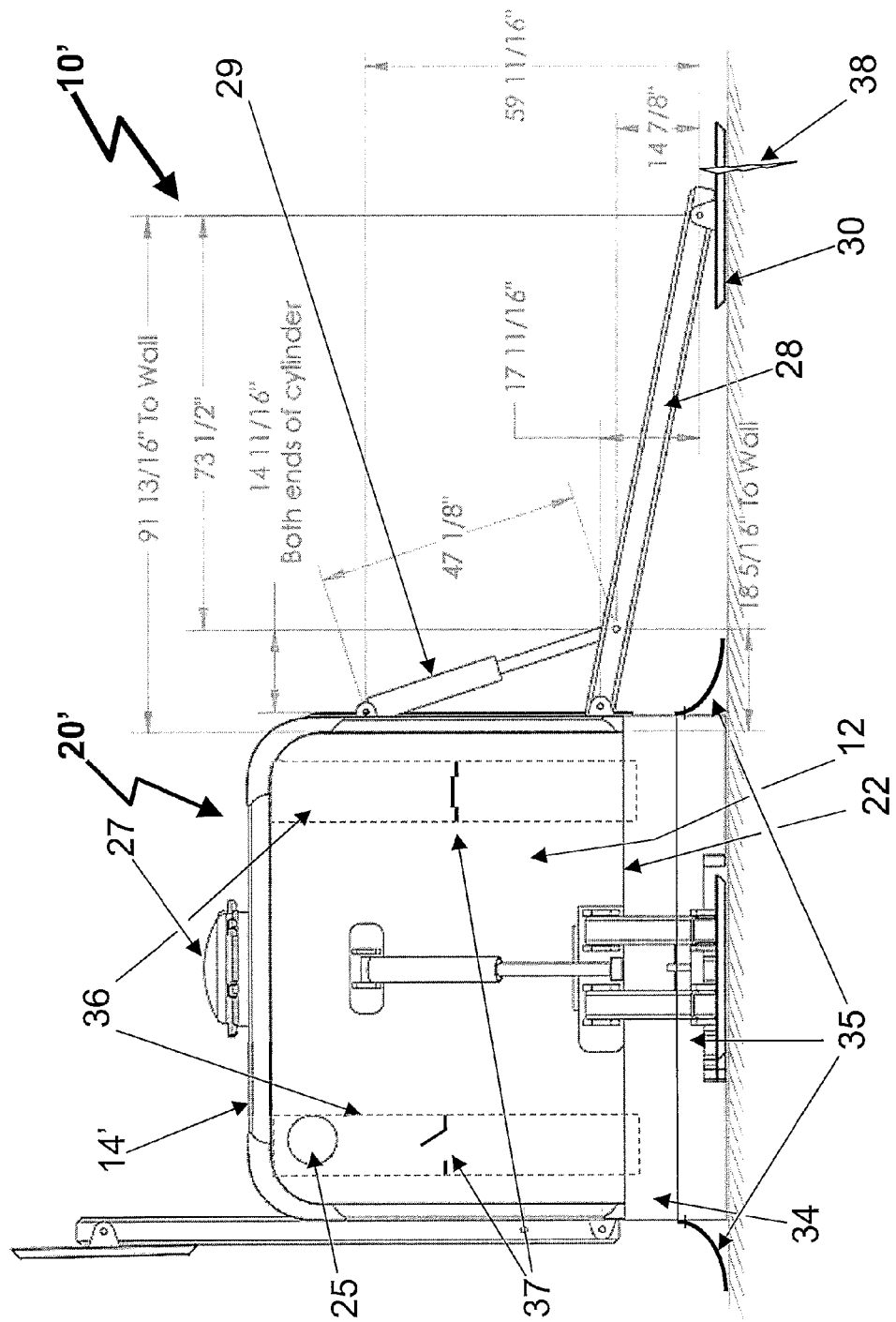
FIG. 3 is an end elevation view of the protective shelter of FIG. 2.
Figure 7A:
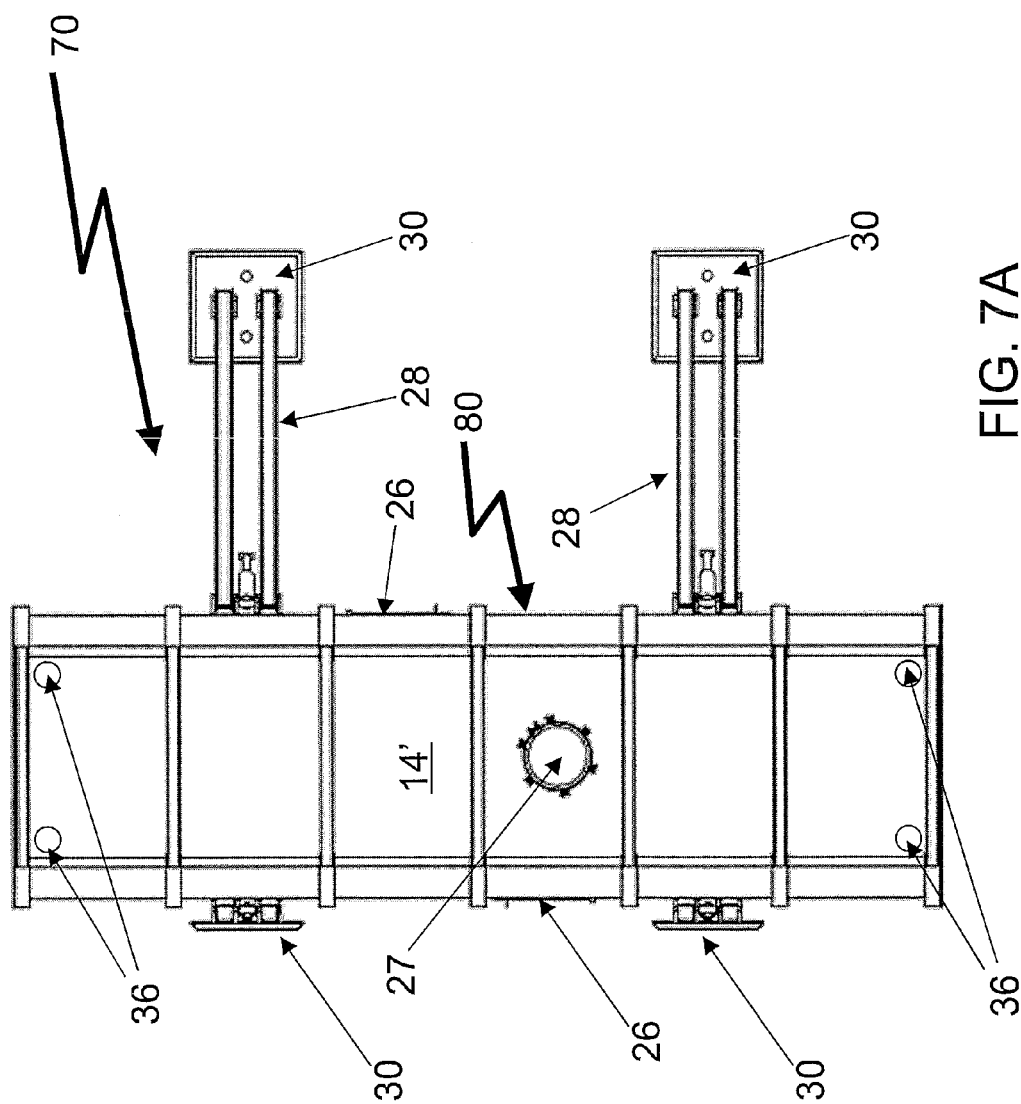
FIGS. 7A-7D respectively illustrate a top plan, short side elevation, perspective, and long side elevation views of a large capacity third embodiment of a protective shelter.
Figure 7B:
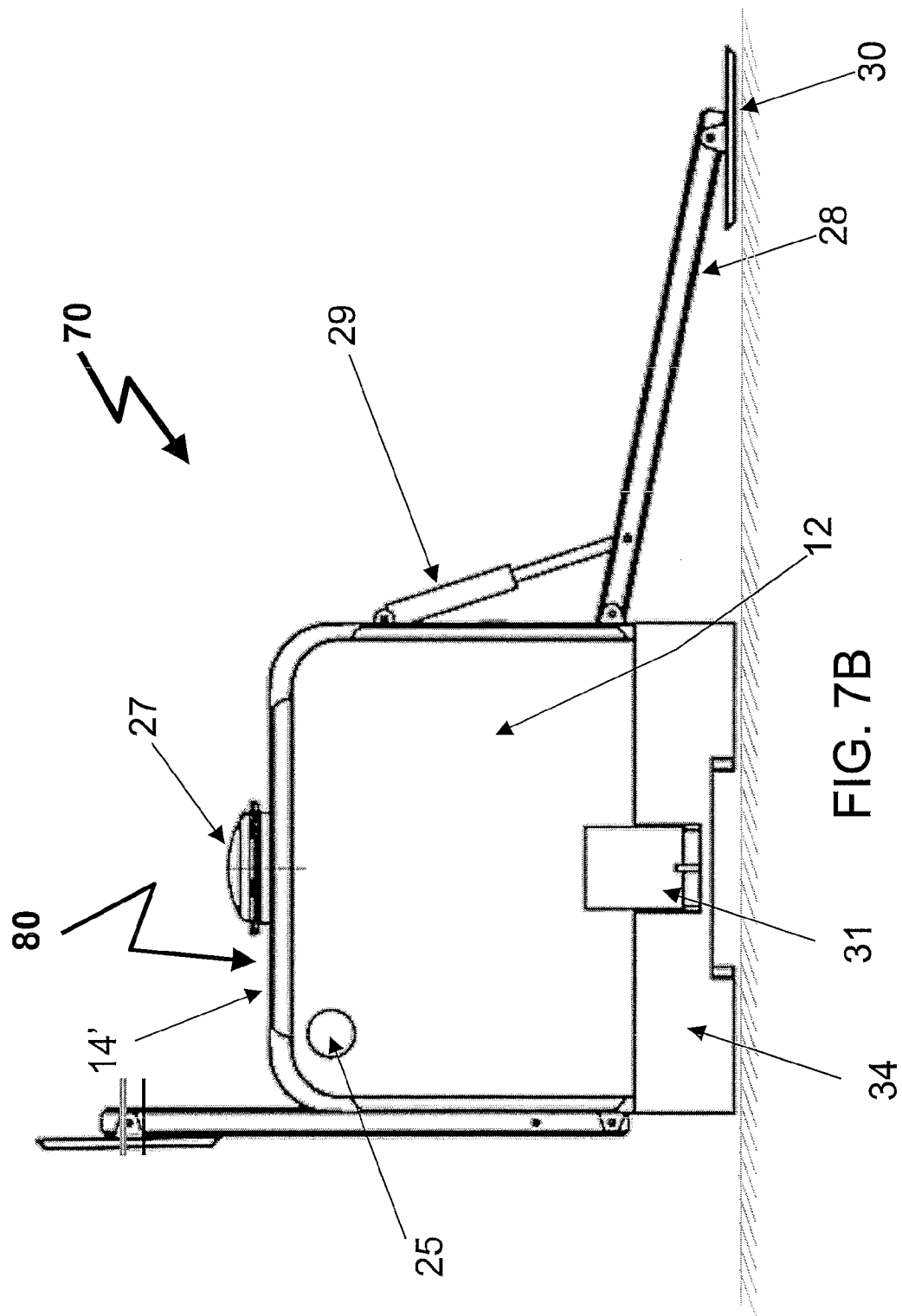
Figure 7C:
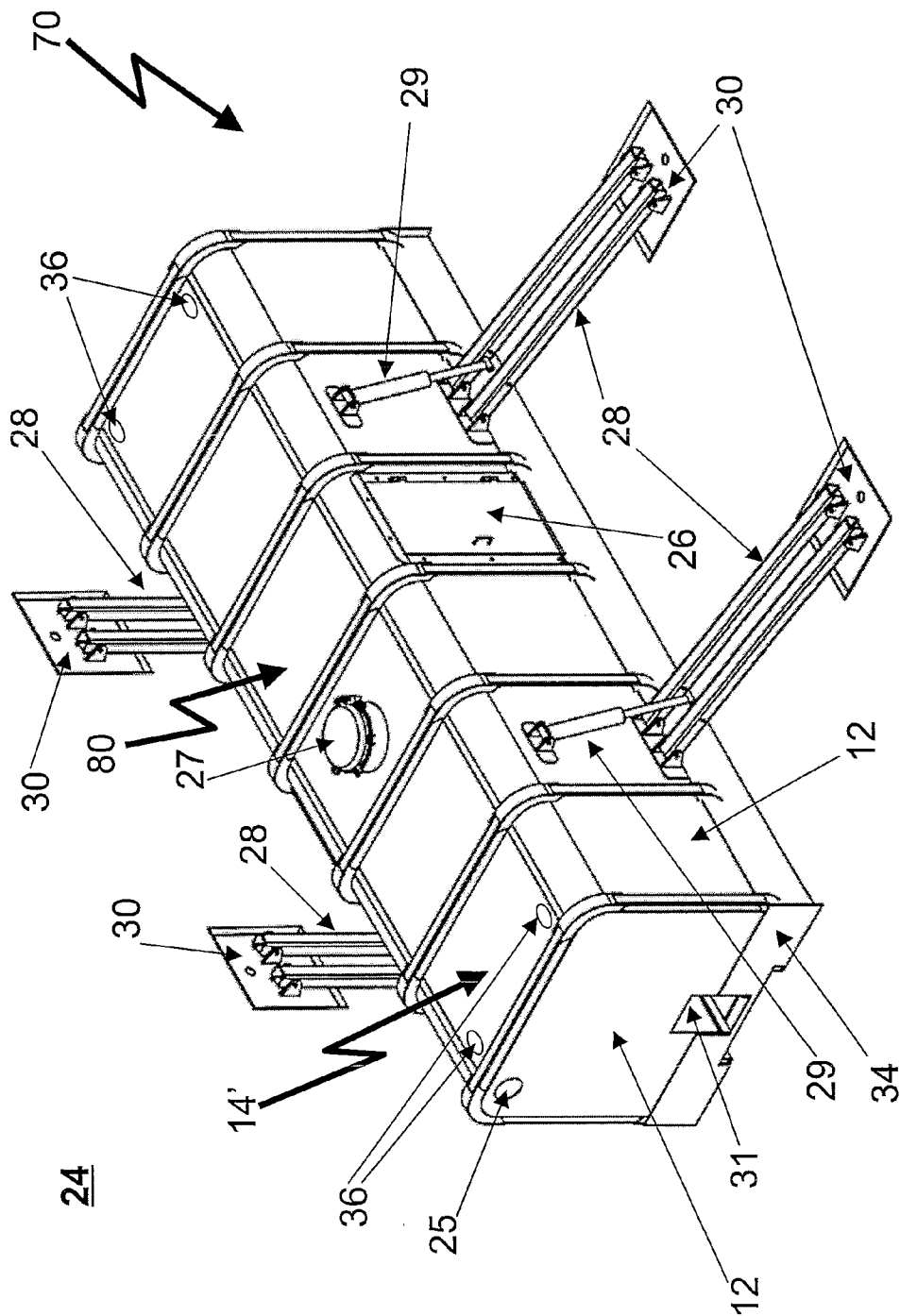
Figure 7D:
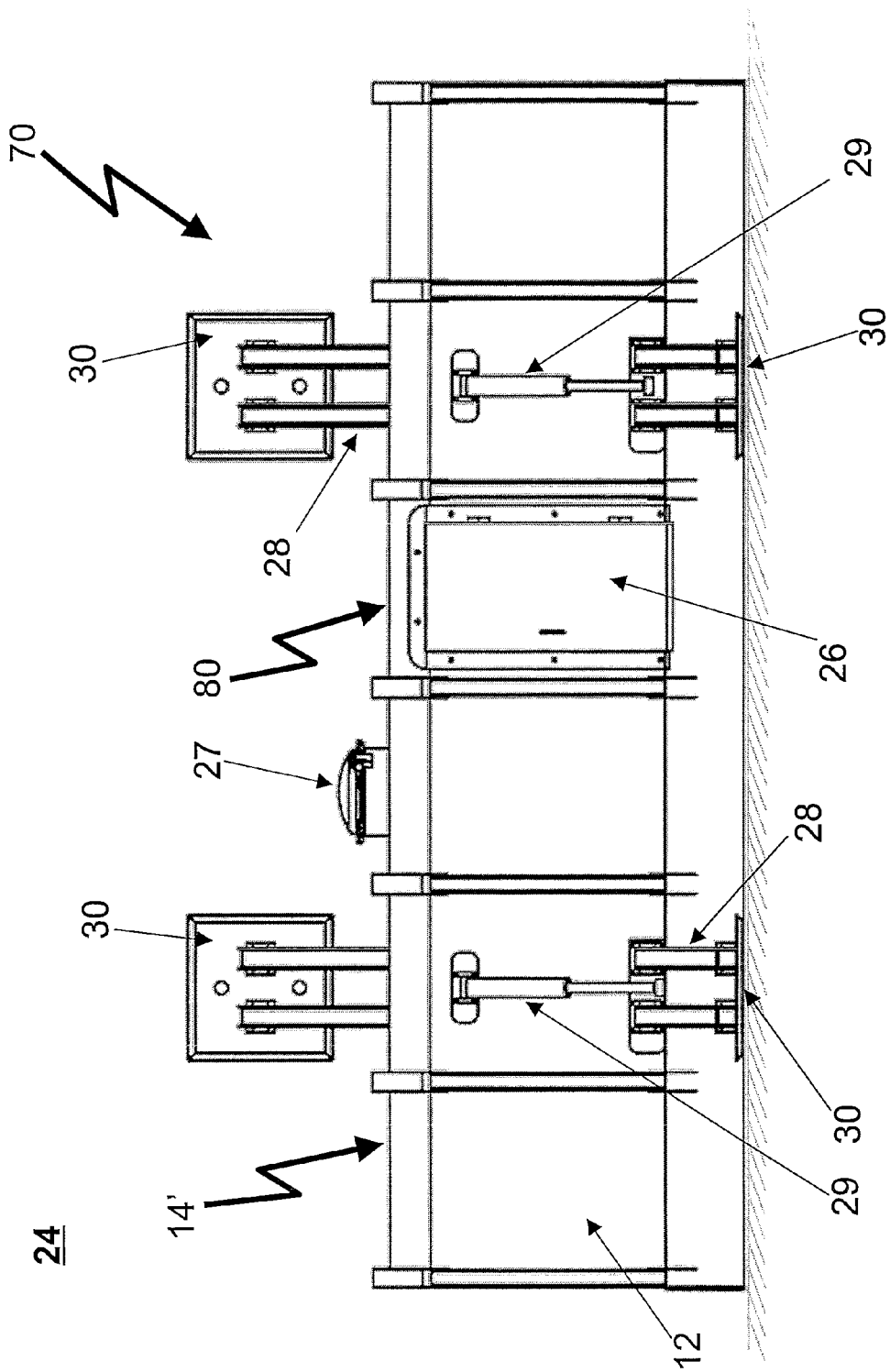

Referring now to FIGS. 2-3, perspective and elevation views of a second embodiment of a protective shelter 10' are depicted. As indicated by like reference numerals, the construction of protective shelter 10' is substantially the same as that of protective shelter 10 of FIG. 1. Accordingly, protective shelter 10' includes an enclosure 20' including a floor 22, four sidewalls 12 and a roof 14' all formed of welded plate steel. Protective shelter 10' may also optionally have stabilizers 28 has previously discussed. Unlike protective shelter 10, protective shelter 10' further includes rigid skirting 34 surrounding the base of sidewalls 12 to form a lower substantially enclosed sub-floor region (air space) below floor 22.

It will be appreciate that when a solid object of any shape, such as enclosure 20', is immersed in a flowing stream of fluid (e.g., a wind), areas of relatively lower and higher pressures are created over the surface of that object according to Bernoulli's principle. These different pressures create static and dynamic forces that can influence the potential movement of the object.

The safety of protective shelter 10' is enhanced by leveraging the wind-induced air pressures to substantially offset the uplift and overturning forces created by high velocity wind passing over enclosure 20'. The wind-induced air pressures are leverage by implementing a plurality of (in this embodiment, four) air ducts 36 that allow rapid air flow between the sub-floor region and the environment 24 above roof 14'. The upper ends of air ducts 36 can be either open or partially shielded to prevent penetration by debris.

Each air duct 36 houses a passively operated unidirectional check valve 37, the operation of which is biased by gravity (and can be enhanced with the aid of a spring) to a closed position and during a wind event is opened by an air pressure differential between the substantially enclosed sub-floor region and the surrounding environment to permit only upward airflow. Thus, in the presence of a sufficient air pressure differential, an air duct 36 evacuates air from the substantially enclosed sub-floor region to the exterior of enclosure 20' above roof 14'. It should be noted that check valves 37 are illustrated approximately at midpoint of air ducts 36, but may alternatively be located at any position along air ducts 36 without negatively affecting the intended functioning. It should also be noted that there is a wide variety of check valve designs and constructions that will perform equally well.

The size, number, shape and location of air ducts 36 can vary between embodiments. For example, other embodiments may include as few as one air duct 36 or more than four. The geometry of air ducts 36 is also not critical. Air ducts 36 can have a circular cross-section (as shown) or any other cross-sectional shape (e.g., rectangular) providing sufficient cross-sectional area to permit rapid evacuation of the air beneath the enclosure 20'. It will also be appreciated that air ducts 36 can also be disposed external to the interior of enclosure 20' (e.g., incorporated into a sidewall 12 and/or reinforcing components thereof or be totally independent of the enclosure 20) to increase usable interior volume within enclosure 20'. Further, the upper openings of air ducts 36 may be located anywhere on or near the roof surface or even the side walls, but (for the illustrated roof design) are most beneficially located adjacent to each of the roof corners where the lowest pressure is generated by wind as it accelerates across roof 14'.

The disclosed air duct and valve arrangement passively and automatically selects the lowest air pressure created by the passage of wind over roof 14' of protective shelter 20' and utilizes the lowest available air pressure to evacuate air from the substantially enclosed sub-floor region, such that the air pressure in that substantially enclosed sub-floor air space is reduced to below the surrounding atmospheric pressure. Because the air duct and valve arrangement causes air to be continually withdrawn from the substantially enclosed sub-floor region of protective shelter 20' under high velocity wind conditions, the substantially enclosed sub-floor region acts as a "suction cup" to counter uplift, sliding and overturning forces exerted by high velocity winds and holds protective shelter 20' securely to the underlying substrate (e.g., ground). In at least some of the preferred embodiments, the holding force exerted by the low pressure in the substantially enclosed sub-floor region is always greater than the uplift force produced by the wind passing over roof 14' (i.e., the greater the wind velocity, the greater the holding force created beneath shelter 20'). This holding force significantly diminishes (and can in some instances completely obviate) the need for anchors 38 or other ground pinning to prevent enclosure 20' from lateral sliding and over turning under high wind conditions.

As best seen in FIG. 3, a semi-rigid or flexible sub-skirt 35, for example, of a rubber or reinforced propylene material, may optionally be additionally attached with bolts, plates and/or adhesives to the entire periphery of the lower edge of the rigid skirt 34. Although an EF-5 tornado with winds of 250 mph has been known to last several minutes, the typical duration of a deadly tornado is on the order of 10-30 seconds. Blast waves from explosions are of even shorter duration, on the order of less than a second. Sub-skirt 35, if present, provides greater conformance to the underlying substrate and serves to reduce the likelihood of pressure-induced "tunneling" under the rigid skirt 34 if protective shelter 10' is placed on an uneven substrate or loose soil subject to wind erosion during a short duration wind event. By conforming to the underlying substrate, sub-skirt 35 can assist in maintaining a vacuum in the substantially enclosed sub-floor region for the greatest time period, as discussed further below with reference to FIG. 4A-4B. It should further be appreciated, the sub-skirt 35 can be formed of rigid metal plate and hinged from the lower periphery of rigid skirting 34 to permit deployment into contact with the substrate.

Referring now to FIG. 4A, there is depicted an elevation view of the long sidewall 12 of protective shelter 10' schematically illustrating the location and functioning of check valves 37 and air ducts 36 during a severe wind event. FIG. 4B is a Cartesian graph of the static air pressures at various locations relative to protective shelter 10' during the severe wind event (assumed to be a 250 mph wind).

As shown, wind 39 impacts a windward sidewall 12 of enclosure 20' and diverts over roof 14'. As shown in FIG. 4B at point A, the wind produces a positive pressure at the windward sidewall 12 of the enclosure 20' significantly above atmospheric pressure (e.g., on the order of +68 psf). As wind 39 is diverted upward to pass over enclosure 20', wind 39 accelerates, and the static pressure drops until reaching its lowest value at point B immediately after turning direction at the roofline. At point B, the air pressure is on the order of −171 psf. The air pressure steadily rises along roof 14' as wind 39 begins to flow parallel to roof 14'. For example, the air pressure reaches it local maximum of approximately −82 psf at point C. As wind 39 begins its downward flow around the end of roof 14' after point C, wind 39 again accelerates, and the static air pressure at point D immediately behind the windward sidewall 12 of enclosure 20' drops to a value on the order of −104 psf. Thereafter, the air pressure steadily rises until at some point downstream of enclosure 20' the air pressure again equals the ambient atmospheric pressure.

As shown in FIG. 4A, the upstream check valve 37 housed in the upstream air duct 36 experiences the lowest of the low pressure regions (e.g., −171 psf) formed by the flow of wind 39 over enclosure 20'. Check valve 37 accordingly opens, and air is evacuated from the substantially enclosed sub-floor region of enclosure 20'. Conversely, because the static air pressure at the downstream air duct 36 is higher (e.g., −82 psf) than at the upstream air duct 36, the pressure differential between the upstream and downstream air ducts 36 (e.g., −171 psf−(−82 psf)=−89 psf) causes the downstream check valve 37 to remain closed, thus blocking air from entering substantially enclosed sub-floor region of enclosure 20' via the downstream air duct 36. The wind-produced low pressure averaged over the entire area of roof 14 (e.g., −130 psf) is a higher pressure than the vacuum created in the substantially enclosed sub-floor region of enclosure 20' (e.g., −171 psf) acting over the entire area of floor 22, resulting in a net downward force that, when operating in combination with the weight of the shelter (e.g., 12,000 lbs.), is more than sufficient to hold enclosure 20' on the underlying substrate with or, in some embodiments, without the aid of stabilizers 28.

With reference now to FIGS. 5A-5B, there are illustrated a side elevation view and corresponding static air pressure graph for the short sidewall 12 of protective shelter 10' schematically illustrating the functioning of check valves 37 and air ducts 36 during a severe (e.g., 250 mph) wind event directed against the larger sidewalls. As can be seen by comparison of FIGS. 5A-5B to FIGS. 4A-4B, check valves 37 and air ducts 36 operate the same way when wind 39 strikes a long sidewall 12 of protective shelter 10' as when wind 39 strikes a short sidewall 12 of protective shelter 10'. In particular, the upstream check valve 37 opens to evacuate the air within the substantially enclosed sub-floor region, thus creating a vacuum that resists the wind-generated uplift on protective shelter 10', while the downstream check valve 37 remains closed.

Referring now to FIGS. 6A-6B, there are depicted a front end view and left side view of an exemplary protective shelter 10' ready for transport on a standardized roll-off container transport 60. In the depicted embodiment, the roll-off container transport is a conventional roll-off container trailer, such as model GN-20 or GN-30 available from Domatex Inc. of Houston, Tex. In an alternative embodiment, roll-off container transport 60 can be a roll-off container truck. The assembly comprising protective shelter 10' and roll-off container transport 60 is preferably less than or equal to the maximum allowed DOT height, width and weight that may be traveled over public roadways without special permits or restrictions.

Currently, the maximum unpermitted DOT-compliant height and width in the United States are 168 and 102 inches, respectively. Thus, it is preferable if the maximum height of the assembly is 168 inches or less (e.g., 161 and $^{15}\!/\!_{16}$" as shown) and the maximum width is 102 inches or less. A greater variation in the length of a protective enclosure is possible while still achieving DOT compliance without securing special permits. For example, a shelter with the maximum unpermitted DOT-compliant width can have a length shorter than 7 feet and as great as 25 feet or longer.

With reference now to FIGS. 7A-7D, there are illustrated top plan, end elevation, perspective and side elevation views, respectively, of a third embodiment of the protective shelter 70. As indicated by like reference numerals, protective shelter 70 is constructed similarly to protective shelter 10 of FIGS. 1A-1D, but has an enclosure 80 of greater length to support a higher occupancy rating (e.g., 25 persons versus 12). Because of its greater length, enclosure 80 has a door 26 on each of its longer sidewalls 12 and omits stabilizers 28 on the shorter sidewalls 12.

Figure 8B:
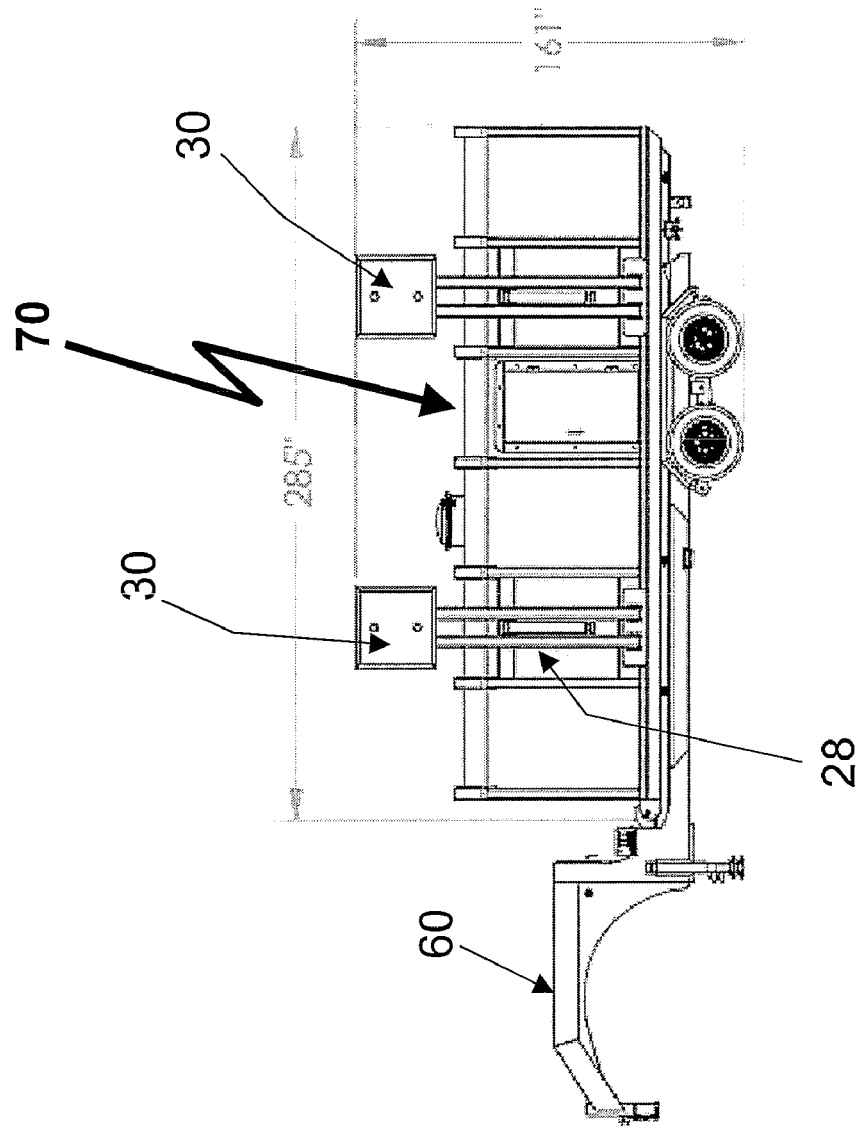
FIGS. 8A-8B respectively depict end and side elevation views of an assembly comprising the protective shelter of FIGS. 7A-7D loaded on a roll-off transport.
Figure 8A:
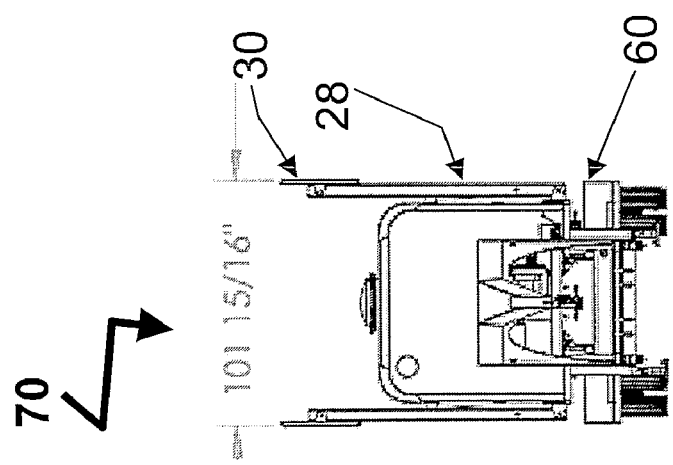

Referring now to FIGS. 8A-8B, there are depicted a front end view and left side view of an exemplary protective shelter 70 ready for transport on a roll-off container transport 60. In the depicted embodiment, the roll-off container transport is again a conventional roll-off container trailer, such as model GN-20 or GN-30 available from Domatex Inc. of Houston, Tex. In an alternative embodiment, roll-off container transport 60 can again be a roll-off container truck. As indicated by the exemplary dimensions given in FIGS. 8A-8B, the assembly comprising protective shelter 70 and roll-off container transport 60 is preferably less than or equal to the maximum unpermitted DOT height, width and weight that may travel over public roadways without special permits or restrictions.

As has been described, a re-deployable aboveground protective shelter is capable of protecting personnel and articles from high velocity wind events (e.g., winds exceeding 250 mph) and withstanding the uplifting, sliding and overturning forces generated by such high velocity wind events. In various embodiments, protective shelters may include:

An enclosure of a material and construction capable of protecting occupants and contents from high winds and the impact of wind borne debris;

An elevated floor of the enclosure that isolates the occupied interior space from the surrounding environment;

A peripheral skirt of rigid and/or semi-rigid material defining a substantially enclosed sub-floor region or air space bounded by the peripheral skirt, the elevated floor of the enclosure and the surface upon which the enclosure rests;

A series of air ducts permitting air flow from the substantially enclosed sub-floor region and the external roof regions of the enclosure;

A unidirectional check valve in each air duct permitting only the evacuation of air from the substantially enclosed sub-floor region and preventing movement of air downward into the substantially enclosed sub-floor region;

At least one protective door for ingress and egress into and out of the protective shelter;

An escape hatch for emergency exit in the event a protective door is inoperable or otherwise blocked;

At least one baffled ventilation opening to provide breathing air for the rated number of occupants while preventing penetration by dangerous airborne objects;

Pressure relief openings to ensure that structural integrity is not compromised due to the internal/external pressure differential created, for example, during the passage of a tornado;

Retractable stabilizers that, when extended, increase the effective width and/or length of the enclosure to enable it to better withstand wind-induced overturning forces;

Hydraulic, pneumatic, electrical, mechanical or manual actuators used individually or in combination to raise, lower, test and lock into place all stabilizers during initial deployment of the unit and its subsequent loading for transport and/or redeployment;

Standardized attachments, cable connections, undercarriage and supports allowing for the use of DOT-compliant roll-off container transport trailers and trucks and facilitating the economic and rapid loading, transportation, unloading and deployment of the protective shelter; and/or Removable anchors (such as earth anchors or earth screws) that optionally can be inserted through stabilizer pads and/or elsewhere to augment the protective shelter's resistance to sliding.

While the present invention has been particularly shown as described with reference to one or more preferred embodiments, it will be understood by those skilled in the art that various changes in form and detail may be made therein without departing from the spirit and scope of the invention.

What is claimed is:

1. A protective shelter, comprising:
    an enclosure having an opening for ingress and egress, a sidewall, a roof, a floor coupled to the sidewall, and at least one support that elevates the floor from a substrate;
    a peripheral skirt extending toward the substrate to form a substantially enclosed sub-floor region bounded by the peripheral skirt and the floor;
    a plurality of air ducts communicating between the substantially enclosed sub-floor region and an exterior region of the enclosure, wherein each of the plurality of air ducts houses a valve that permits airflow from the substantially enclosed sub-floor region to the exterior region and resists airflow from the exterior region to the substantially enclosed sub-floor region; and
    a stabilizer coupled to the enclosure, wherein the stabilizer is horizontally extendable from the sidewall of the enclosure to brace the enclosure against the substrate about the protective shelter in an extended position and is further retractable from the extended position.

2. The protective shelter of claim 1, wherein the enclosure comprises welded metal plate.

3. The protective shelter of claim 1, wherein:
    the at least one sidewall comprises at least a longer sidewall and a shorter sidewall; and
    the protective shelter further comprises a cable attachment point disposed adjacent the shorter sidewall to facilitate loading and unloading the protective shelter from a roll-off container transport.

4. The protective shelter of claim 1, wherein the peripheral skirt includes:
    a rigid skirt formed of metal plate; and
    a semi-rigid skirt extending toward the substrate from the rigid skirt.

5. The protective shelter of claim 1, wherein the roof has at least one edge region having a decreasing height at points further from a central axis of the enclosure.

6. An assembly, comprising:
    a protective shelter in accordance with claim 1; and
    a roll-off container transport bearing the protective shelter.

7. A protective shelter, comprising:
    an enclosure having at least a floor, at least one sidewall coupled to the floor, and a roof coupled to the at least one sidewall;
    at least one support to elevate the floor from a substrate;
    a peripheral skirt extending toward the substrate to form a substantially enclosed sub-floor region bounded by the peripheral skirt, the substrate and the floor; and
    one or more air ducts communicating between the substantially enclosed sub-floor region and an exterior region of the enclosure, wherein each of the plurality of air ducts houses a valve that permits airflow from the substantially enclosed sub-floor region to the exterior region and resists airflow from the exterior region to the substantially enclosed sub-floor region.

8. The protective shelter of claim 7, wherein the enclosure comprises welded metal plate.

9. The protective shelter of claim 7, wherein:
    the at least one sidewall comprises at least a longer sidewall and a shorter sidewall; and
    the protective shelter further comprises a cable attachment point disposed adjacent the shorter sidewall to facilitate loading and unloading the protective shelter from a roll-off container transport.

10. The protective shelter of claim 7, wherein the peripheral skirt includes:
    a rigid skirt formed of metal plate; and
    a semi-rigid skirt extending toward the substrate from the rigid skirt.

11. The protective shelter of claim 7, and further comprising:
    at least one stabilizer, coupled to the enclosure, wherein the at least one stabilizer is horizontally extendable from the enclosure to contact a substrate in an extended position and retractable from the extended position.

12. The protective shelter of claim 7, wherein the roof has at least one edge region having a decreasing height at points further from a central axis of the enclosure.

13. An assembly, comprising:
    a protective shelter in accordance with claim 7; and
    a roll-off container transport bearing the protective shelter.

14. A protective shelter, comprising:
    an enclosure formed of welded metal plate, the enclosure having at least a floor, at least one sidewall coupled to the floor, and a roof coupled to the at least one sidewall;
    at least one support to elevate the floor from a substrate;
    a peripheral skirt extending toward the substrate to form a substantially enclosed sub-floor region bounded by the peripheral skirt, the substrate and the floor;
    a plurality of air ducts communicating between the substantially enclosed sub-floor region and an exterior region of the enclosure, wherein each of the plurality of air ducts houses a valve that permits airflow from the substantially enclosed sub-floor region to the exterior region and resists airflow from the exterior region to the substantially enclosed sub-floor region; and at least one stabilizer, coupled to the enclosure, wherein the at least one stabilizer is horizontally extendable from the enclosure to contact a substrate in an extended position and retractable from the extended position.

15. The protective shelter of claim 14, wherein:
the at least one sidewall comprises at least a longer sidewall and a shorter sidewall; and
the protective shelter further comprises a cable attachment point disposed adjacent the shorter sidewall to facilitate loading and unloading the protective shelter from a roll-off container transport.

16. The protective shelter of claim 14, wherein the peripheral skirt includes:
a rigid skirt formed of metal plate; and
a semi-rigid skirt extending toward the substrate from the rigid skirt.

17. The protective shelter of claim 14, wherein the roof has at least one edge region having a decreasing height at points further from a central axis of the enclosure.

18. An assembly, comprising:
a protective shelter in accordance with claim 14; and
a roll-off container transport bearing the protective shelter.

19. A method of deploying a protective shelter, said method comprising:
transporting, to an installation site having a substrate, a protective shelter including:
an enclosure having at least a floor, at least one sidewall coupled to the floor, and a roof coupled to the at least one sidewall;
at least support to elevate the floor from the substrate;
one or more valved air ducts communicating between a region below the floor and an exterior region of the enclosure, and
a peripheral skirt extending below the floor; and
placing the protective shelter on the substrate such that the peripheral skirt forms a substantially enclosed sub-floor region bounded by the peripheral skirt, the substrate and the floor.

20. The method of claim 19, wherein transporting the protective shelter comprises transporting the protective shelter on a roll-off transport.

21. The method of claim 19, wherein:
the protective shelter further includes at least one retractable and extendable stabilizer;
the method further comprises extending from the protective shelter the at least one stabilizer in at least a horizontal direction, such that the at least one stabilizer contacts the substrate in an extended position.

22. The method of claim 21, and further comprising anchoring the at least one stabilizer to the substrate in the extended position.

23. The method of claim 22, wherein the anchoring comprises anchoring the at least one stabilizer utilizing an earth anchor.

24. The method of claim 22, and further comprising:
field proving installation of the protective shelter to withstand a rated wind speed by attempting to overcome the anchoring of the at least one stabilizer to the substrate by applying at least a predetermined force to the at least one stabilizer.

25. The protective shelter of claim 1, wherein:
the stabilizer has a proximal end and a distal end;
the distal end has a contact pad; and
in the extended position, a closest point of contact of the contact pad to the substrate is spaced from the sidewall.

26. The protective shelter of claim 1, wherein:
the stabilizer has a proximal end and a distal end;
the stabilizer has a retracted position in which the distal end has an elevation greater than the total height of the sidewall.

27. The protective shelter of claim 26, wherein the elevation of the stabilizer in the retracted position is sized such that the protective shelter, when loaded for transport, remains within a maximum unpermitted height for roadway transport.

28. The protective shelter of claim 1, wherein the stabilizer, when in the extended position, extends substantially orthogonally from the sidewall.

29. The protective shelter of claim 1, wherein the sidewall has a total height and the stabilizer is coupled to the sidewall at an elevation greater than half the total height.

30. The protective shelter of claim 29, wherein:
the stabilizer is coupled to the sidewall at a plurality of points, including a first point at an elevation greater than half the total height and a second point at an elevation less than half the total height.

* * * * *